US009976643B2

(12) United States Patent
Yanase et al.

(10) Patent No.: US 9,976,643 B2
(45) Date of Patent: May 22, 2018

(54) DIFFERENTIAL DEVICE AND METHOD OF ASSEMBLING THE SAME

(71) Applicant: MUSASHI SEIMITSU INDUSTRY CO., LTD., Toyohashi-shi, Aichi (JP)

(72) Inventors: Yoichi Yanase, Toyohashi (JP); Tetsuro Hamada, Toyohashi (JP); Shinichi Murata, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 30 days.

(21) Appl. No.: 15/391,447

(22) Filed: Dec. 27, 2016

(65) Prior Publication Data

US 2017/0108106 A1    Apr. 20, 2017

Related U.S. Application Data

(63) Continuation of application No. 14/611,621, filed on Feb. 2, 2015, now Pat. No. 9,568,084.

(30) Foreign Application Priority Data

Feb. 3, 2014 (JP) ................................. 2014-018885

(51) Int. Cl.
*F16H 48/08* (2006.01)
*F16H 48/40* (2012.01)
(Continued)

(52) U.S. Cl.
CPC ............. *F16H 48/40* (2013.01); *F16H 48/08* (2013.01); *F16H 57/023* (2013.01);
(Continued)

(58) Field of Classification Search
CPC ..... F16H 48/08; F16H 48/40; F16H 2048/082
See application file for complete search history.

(56) References Cited

U.S. PATENT DOCUMENTS 2,061,009 A   11/1936 Rothrock
3,651,713 A   3/1972 Mueller
(Continued)

FOREIGN PATENT DOCUMENTS

CN   1232734 A   10/1999
JP   H02-89845 A   3/1990
(Continued)

OTHER PUBLICATIONS

Official Communication (Decision of Granting a Patent) issued in corresponding Japanese Patent Application No. 2016-197450.
(Continued)

*Primary Examiner* — Tisha D Lewis
(74) *Attorney, Agent, or Firm* — Carrier Blackman & Associates, P.C.; Joseph P. Carrier; William D. Blackman

(57) ABSTRACT

A differential device includes: a differential gear mechanism; and an integrated differential case housing the mechanism, the differential case including bearing bosses formed integrally on one and other side portions thereof and aligned on a same axis to be rotatably supported by a transmission case; a work window being provided in the differential case; sleeves rotatably supported by the bosses and connected to side gears of the mechanism liquid-tightly. The sleeves can be passed through an inside of the differential case from the window and fitted and inserted to inner peripheries of the bosses, falling-off prevention devices are provided between the sleeves and the bosses, and seal devices for preventing lubricating oil in the differential case from flowing out are provided between the side gears and the sleeves. Accordingly, when drive shafts are removed from the differential device, the oil in the transmission and differential cases does not flow out.

1 Claim, 4 Drawing Sheets

(51) Int. Cl.
*F16H 57/023* (2012.01)
*F16H 48/38* (2012.01)
*F16H 57/00* (2012.01)

(52) U.S. Cl.
CPC .................. *F16H 2048/382* (2013.01); *F16H 2057/0056* (2013.01); *F16H 2057/0235* (2013.01)

(56) References Cited

U.S. PATENT DOCUMENTS

| | | | |
|---|---|---|---|
| 3,726,154 A | 4/1973 | Diessner | |
| 3,772,547 A * | 11/1973 | Abate | G01P 3/443 310/168 |
| 4,643,045 A * | 2/1987 | Katayama | B60K 17/346 180/249 |
| 4,703,671 A * | 11/1987 | Jikihara | F16H 48/08 475/158 |
| 4,953,670 A | 9/1990 | Chemelewski | |
| 5,021,038 A | 6/1991 | Beigang | |
| 5,400,506 A | 3/1995 | Ichiki et al. | |

FOREIGN PATENT DOCUMENTS

| | | |
|---|---|---|
| JP | H04-113931 A | 4/1992 |
| JP | 2000-297857 A | 10/2000 |
| JP | 2001-141038 A | 5/2001 |
| JP | 3751488 B2 | 3/2006 |
| JP | 2013-072524 A | 4/2013 |

OTHER PUBLICATIONS

Office Action (Decision of Granting a Patent) dated Oct. 4, 2017 issued in the corresponding Japanese Patent Application No. 2014-018885.

Office Action issued in the corresponding Chinese patent application 201510053777.9 dated Feb. 2, 2018.

\* cited by examiner

DIFFERENTIAL DEVICE AND METHOD OF ASSEMBLING THE SAME

CROSS-REFERENCE TO RELATED APPLICATIONS

This application is a continuation of U.S. application Ser. No. 14/611,621, filed 2 Feb. 2015, which claims priority under 35 USC § 119 based on Japanese patent application No. 2014-018885, filed on 3 Feb. 2014. The subject matter of these priority documents are incorporated by reference herein in their entirety.

BACKGROUND OF THE INVENTION

1. Field of the Invention

The present invention relates to an improvement of a differential device comprising: a differential gear mechanism; and an integrated differential case housing the differential gear mechanism, the differential case including: first and second bearing bosses formed integrally on one side portion and other side portion of the differential case and aligned on a same axis to be rotatably supported by a transmission case; a work window for inserting the differential gear mechanism, the work window being provided in a peripheral wall of the differential case; a pair of sleeves being rotatably supported by the first and second bearing bosses and being connected to a pair of left and right side gears of the differential gear mechanism in a liquid tight manner; oil seals being set between outer end portions of the sleeves which protrude from the first and second bearing bosses and the transmission case; and left and right drive shafts being connected to the pair of side gears or the sleeves, and the present invention also relates to an improvement of a method of assembling the differential device.

2. Description of the Related Art

Such a differential device is known as disclosed in Japanese Patent No. 3751488 and Japanese Patent Application Laid-open No. 2013-72524.

In the above-described differential device, separation between the side gears and the sleeves enables the differential gear mechanism including the side gears to be incorporated into the integrated differential case through the work window. Moreover, even when the drive shafts are removed from the differential device during maintenance, lubricating oil in the transmission case and the differential case is prevented from flowing out. Thus, lubricating oil does not need to be drained every time the drive shafts are removed, and ease of maintenance is good.

However, in the conventional differential device, after the differential gear mechanism including the side gears is incorporated into the differential case, the sleeves are fitted and inserted into the first and second bearing bosses from outside and connected to the side gears by adhesive bonding or special connecting means. Accordingly, it cannot be said that ease of assembly is good.

SUMMARY OF THE INVENTION

The present invention has been made in view of the above-described circumstances, and an object of the present invention is to provide a differential device which has good ease of assembly and in which even when drive shafts are removed from the differential device, lubricating oil in a transmission case and a differential case does not flow out and good ease of maintenance can be ensured, and a method of assembling the same.

In order to achieve the object, according to a first aspect of the present invention, there is provided a differential device comprising: a differential gear mechanism; and an integrated differential case housing the differential gear mechanism, the differential case including: first and second bearing bosses formed integrally on one side portion and other side portion of the differential case and aligned on a same axis to be rotatably supported by a transmission case; a work window for inserting the differential gear mechanism, the work window being provided in a peripheral wall of the differential case; and a pair of sleeves rotatably supported by the first and second bearing bosses and connected to a pair of left and right side gears of the differential gear mechanism in a liquid tight manner, wherein oil seals are to be set between outer end portions of the sleeves which protrude from the first and second bearing bosses and the transmission case, and left and right drive shafts are to be connected to the pair of side gears or the sleeves, wherein the sleeves are configured to be capable of being passed through an inside of the differential case from the work window and fitted and inserted to inner peripheries of the bearing bosses, sleeve retainers for preventing the sleeves from falling off outward in an axial direction thereof are provided between the sleeves and the first and second bearing bosses, and a seal device for preventing lubricating oil in the differential case from flowing out of spaces between the side gears and the sleeves are provided between the side gears and the sleeves.

According to the first aspect of the present invention, the ease of assembly of the differential device is good, and, even when the drive shafts are removed from the differential device, lubricating oil in the transmission case and the differential case does not flow out and good ease of maintenance can be ensured.

In particular, after the sleeves are inserted into the differential case through the work window, the sleeve retainers can be established at the same time as the sleeves are fitted and inserted into the first and second bearing bosses. Moreover, when the differential gear mechanism is incorporated into the differential case, the sleeves are automatically clamped between the sleeve retainers and the side gears. Accordingly, axial movements of the sleeves can be restricted by a simple structure. This structure can contribute to an improvement in ease of assembly.

According to a second aspect of the present invention, in addition to the first aspect, the sleeves have outside diameters smaller than an inside diameter of the work window and have lengths shorter than an inside diameter of the differential case.

According to the second aspect of the present invention, the sleeves can easily be fitted and inserted to the inner peripheries of the first and second bearing bosses by freely changing orientations of the sleeves inserted into the differential case through the work window within the differential case. Thus, ease of assembly can be improved.

According to a third aspect of the present invention, in addition to any one of the first and second aspects, the sleeve retainers comprise annular inward-facing step portions formed on inner peripheries of the first and second bearing bosses, and annular outward-facing step portions formed on outer peripheries of the sleeves to come in contact with the inward-facing step portions.

According to the third aspect of the present invention, the sleeve retainers with a simple structure can be configured. This can contribute to cost reduction.

According to a fourth aspect of the present invention, in addition to any one of the first and second aspects, the seal device comprises seal members set in fitting portions between the side gears and the sleeves. Note that the seal members correspond to O-rings 26, 32 in embodiments of the present invention.

According to the fourth aspect of the present invention, the seal device with a simple structure can be configured. This can contribute to cost reduction.

According to a fifth aspect of the present invention, there is provided a method of assembling the differential device according to the first aspect, comprising: a first step of passing the sleeves through the work window and the inside of the differential case and fitting and inserting the sleeves to the inner peripheries of the first and second bearing bosses to establish the sleeve retainers; and a second step of, after the first step, incorporating the differential gear mechanism into the differential case through the work window to establish connection between the side gears and the sleeves.

According to the fifth aspect of the present invention, the differential device can easily be assembled.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Hereinafter, embodiments of the present invention will be described based on the accompanying drawings.

Figure 1:
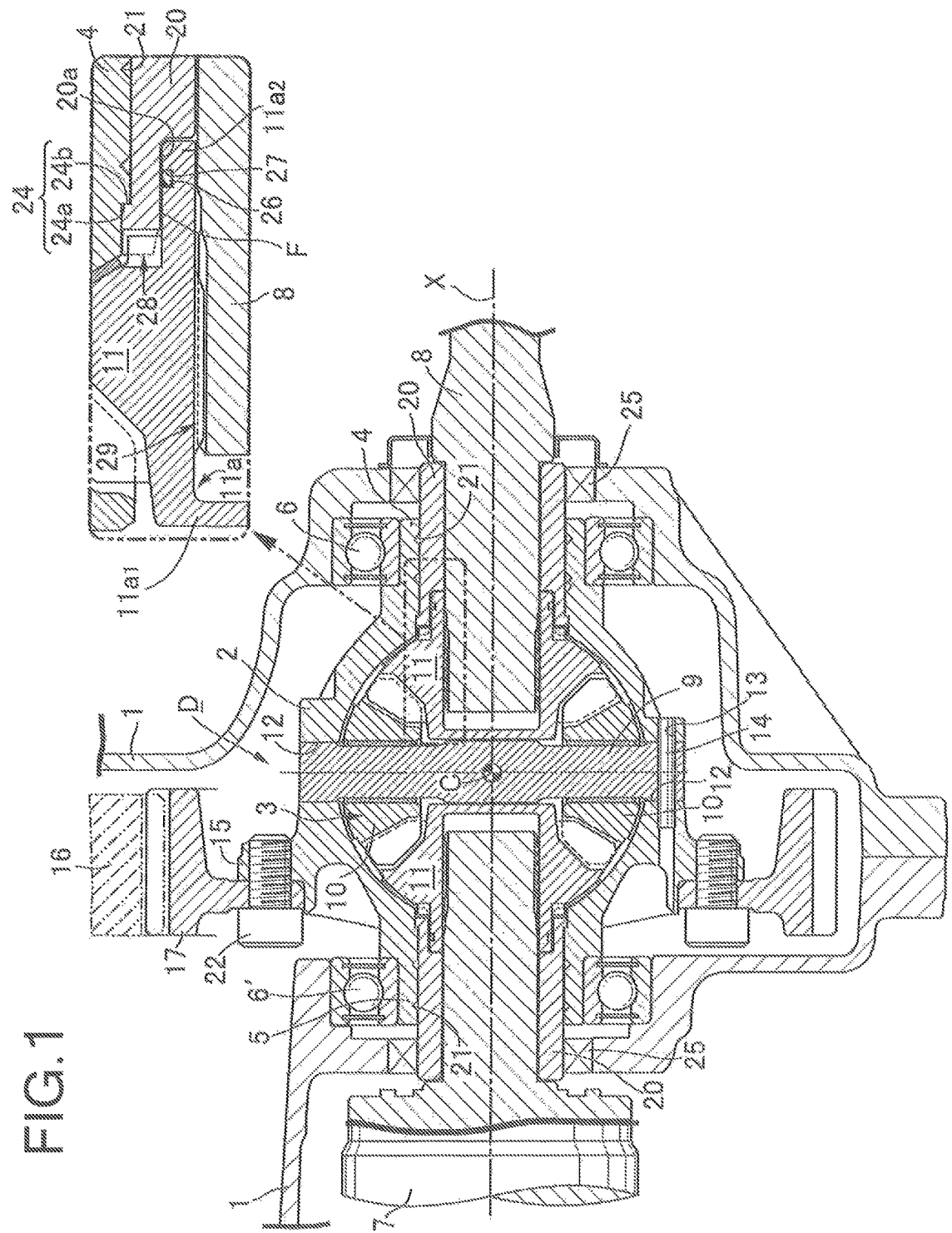
FIG. 1 is a longitudinal sectional elevation view of a differential device according to a first embodiment of the present invention.

First, a first embodiment of the present invention shown in FIGS. 1 to 3 will be described. In FIG. 1, a differential device D is housed in a transmission case 1 of an automobile. This differential device D includes an integrated differential case 2 and a differential gear mechanism 3 housed in this differential case 2. On a right side portion and a left side portion of the differential case 2, a first bearing boss 4 and a second bearing boss 5 aligned on a same axis X are formed integrally therewith. These first and second bearing bosses 4, 5 are supported by the transmission case 1 via bearings 6, 6'.

The differential gear mechanism 3 includes a pinion shaft 9 held by the differential case 2 to pass through a center C of the differential case 2 while being orthogonal to the axis X, a pair of pinion gears 10 supported by the pinion shaft 9, a pair of side gears 11 meshing with the pinion gears 10, and a pair of sleeves 20 connected to hubs 11a of the side gears 11 and rotatably supported by the first and second bearing bosses 4, 5, respectively. A back face of each gear is rotatably supported by a spherical inner surface of the differential case 2. Helical lubrication grooves 21 are formed in inner peripheral surfaces of the first and second bearing bosses 4, 5.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves prevention of the falling off of the pinion shaft 9 from the supporting holes 12.

Moreover, the differential case 2 has an annular flange 15 formed integrally therewith on an intermediate portion which is offset from the center C of the differential case 2 toward the second bearing boss 5 side. A ring gear 17 meshing with an output gear 16 of a gearbox is fastened to the flange 15 with a bolt 22.

Figure 2:
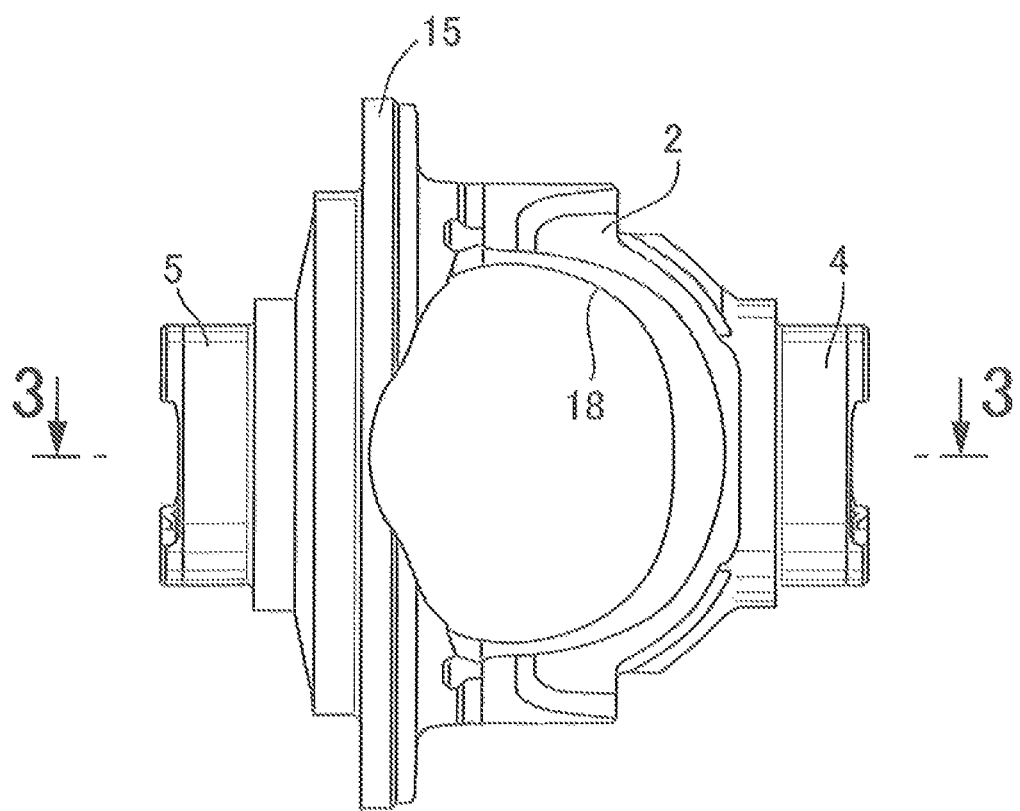
FIG. 2 is an elevation view of a differential case of the above-described differential device.
Figure 3:
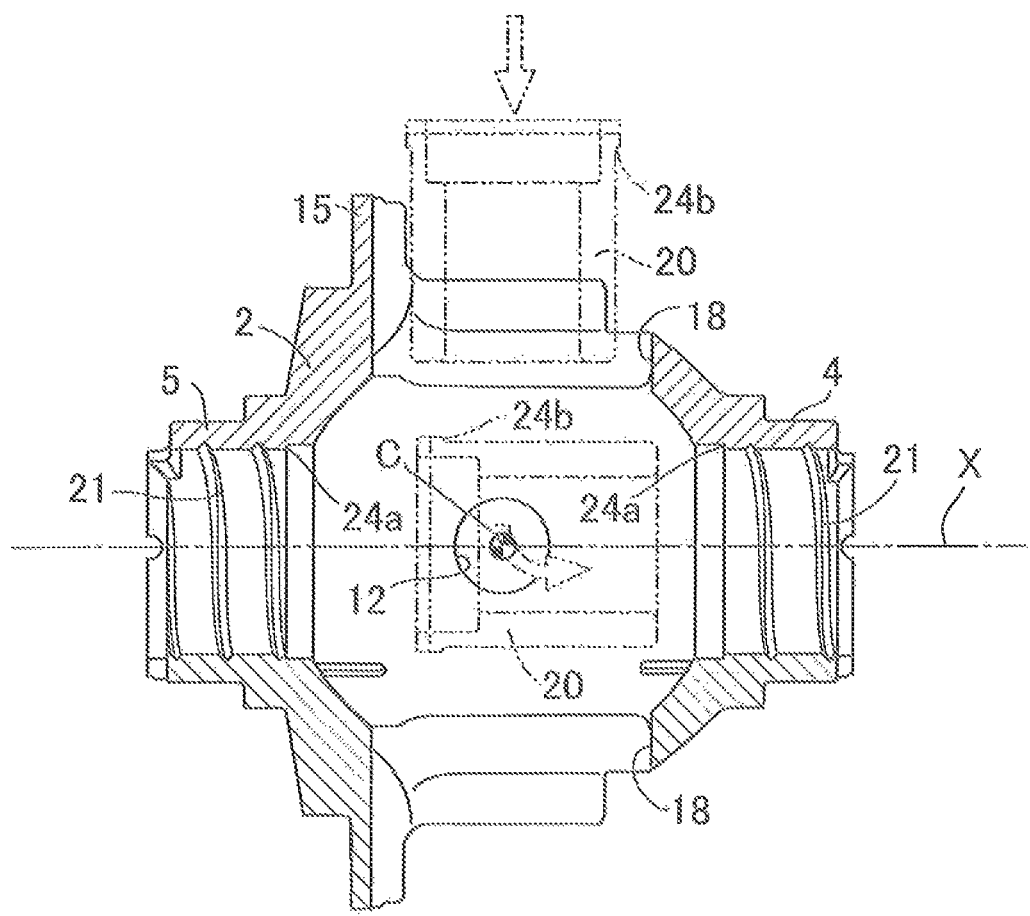
FIG. 3 is a sectional view taken along line 3-3 of FIG. 2.

As shown in FIGS. 2 and 3, in portions of a peripheral wall of the differential case 2 which face each other on a diametral line orthogonal to the axis X, a pair of work windows 18 for machining the spherical inner surface of the differential case 2 and for facilitating insertion of the differential gear mechanism 3 into the differential case 2 are provided.

The sleeves 20 are also inserted into the differential case 2 through the work windows 18 and fitted and inserted to inner peripheries of the corresponding bearing bosses 4, 5. To enable such assembly, the sleeves 20 have outside diameters smaller than inside diameters of the work windows 18, and have lengths shorter than an inside diameter of an inner peripheral surface of the differential case 2.

Referring again to FIG. 1, sleeve retainers 24 for preventing the sleeves 20 from falling off outward in an axial direction thereof are provided between the pair of sleeves 20 and the first and second bearing bosses 4, 5. The sleeve retainers 24 include annular inward-facing step portions 24a formed on inner peripheries of the first and second bearing bosses 4, 5, and annular outward-facing step portions 24b formed on outer peripheries of the sleeves 20 to come in contact with the above-described inward-facing step portions 24a.

Moreover, the sleeves 20 are configured such that outer end portions thereof protrude from the corresponding bearing bosses 4, 5 outward, and oil seals 25 are interposed between the outer end portions and the transmission case 1, respectively.

The hub 11a of the side gear 11 is formed in a shape of a bottomed cylinder having a bottom portion $11a_1$ facing toward the pinion shaft 9 and having a tip end portion $11a_2$ protruding from a back face of the side gear 11. The tip end portion $11a_2$ of the hub 11a is fitted to an annular recessed portion 20a formed on an inner periphery of an inner end portion of the sleeve 20 via an O-ring 26. The O-ring 26 is attached to an annular seal groove 27 formed in an outer periphery of the tip end portion $11a_2$ of the hub 11a.

Moreover, a back face portion of the side gear 11 and the inner end portion of the corresponding sleeve 20 are connected in a direction of rotation via a spline 28.

Left and right drive shafts 7, 8 respectively connected to unillustrated left and right axles pass through the sleeves 20 and are fitted to inner peripheries of the hubs 11a of the side gears 11 via splines 29.

Next, operations of this embodiment will be described. When the differential device D is assembled, as shown in FIG. 3, each of the left and right sleeves 20 is first inserted into the differential case 2 through the work window 18 and then turned inside the differential case 2 to be fitted and inserted to the inner periphery of the first bearing boss 4 or the second bearing boss 5, and the outward-facing step portion 24b of the sleeve 20 is brought into contact with the inward-facing step portion 24a of the corresponding bearing boss 4 or 5. Subsequently, the side gears 11 and the pinion gears 10 are sequentially incorporated into the differential case 2 through the work window 18. The tip end portions 11$a_2$ of the hubs 11$a$ of the side gears 11 are fitted to the annular recessed portions 20$a$ of the corresponding sleeves 20, and the O-rings 26 attached to the seal grooves 27 are brought into tight contact with the inner peripheral surfaces of the annular recessed portions 20$a$. Moreover, the back face portions of the side gears 11 are connected to the inner end portions of the sleeves 20 via the splines 28. Finally, the pinion shaft 9 for supporting the pinion gears 10 is fitted and inserted into the supporting holes 12 of the differential case 2, and the falling-off prevention pin 14 is press-fitted into the differential case 2 and the pinion shaft 9.

In this way, the sleeves 20 are inserted into the differential case 2 through the work window 18 and then fitted and inserted into the first and second bearing bosses 4, 5, and, at the same time, contacts between the inward-facing step portions 24$a$ and the outward-facing step portions 24$b$ of the sleeve retainers 24 are achieved. Accordingly, good ease of assembly can be obtained. Also, when the differential gear mechanism 3 is incorporated into the differential case 2, the sleeves 20 are automatically clamped between the inward-facing step portions 24$a$ of the first and second bearing bosses 4, 5 and the side gears 11. Accordingly, axial movements of the sleeves 20 can be restricted by a simple structure.

The differential device D assembled as described above is incorporated into the transmission case 1, and oil seals 25 are set between the outer end portions of the sleeves 20 and the transmission case 1. Then, lubricating oil is injected into the transmission case 1. At this time, part of the lubricating oil flows into the differential case 2 through the work windows 18 to be used for lubrication between various portions of the differential gear mechanism 3.

Thus, the lubricating oil in the transmission case 1 is prevented from flowing out of the outer peripheries of the outer end portions of the sleeves 20 by the oil seals 25, and the lubricating oil in the differential case 2 is prevented from flowing out of fitting portions F between the side gears 11 and the sleeves 20 by the O-rings 26. This means that the lubricating oil in the transmission case 1 and the differential case 2 does not flow out even when the drive shafts 7, 8 are removed from the side gears 11.

After the transmission case 1 housing the differential device D is mounted on the automobile, the left and right drive shafts 7, 8 are fitted to the inner peripheries of the hubs 11$a$ of the corresponding side gears 11 via the splines 29.

When the differential device D is activated, rotating torque from the side gears 11 is transmitted to the drive shafts 7, 8 via the splines 29. At the same time, rotation of the side gears 11 is transmitted to the sleeves 20 via the splines 28. Accordingly, the side gears 11, the drive shafts 7, 8, and the sleeves 20 integrally rotate. At this time, the outer peripheral surfaces of the sleeves 20 are lubricated with the lubricating oil held in the lubrication grooves 21 of the first and second bearing bosses 4, 5.

Figure 4:
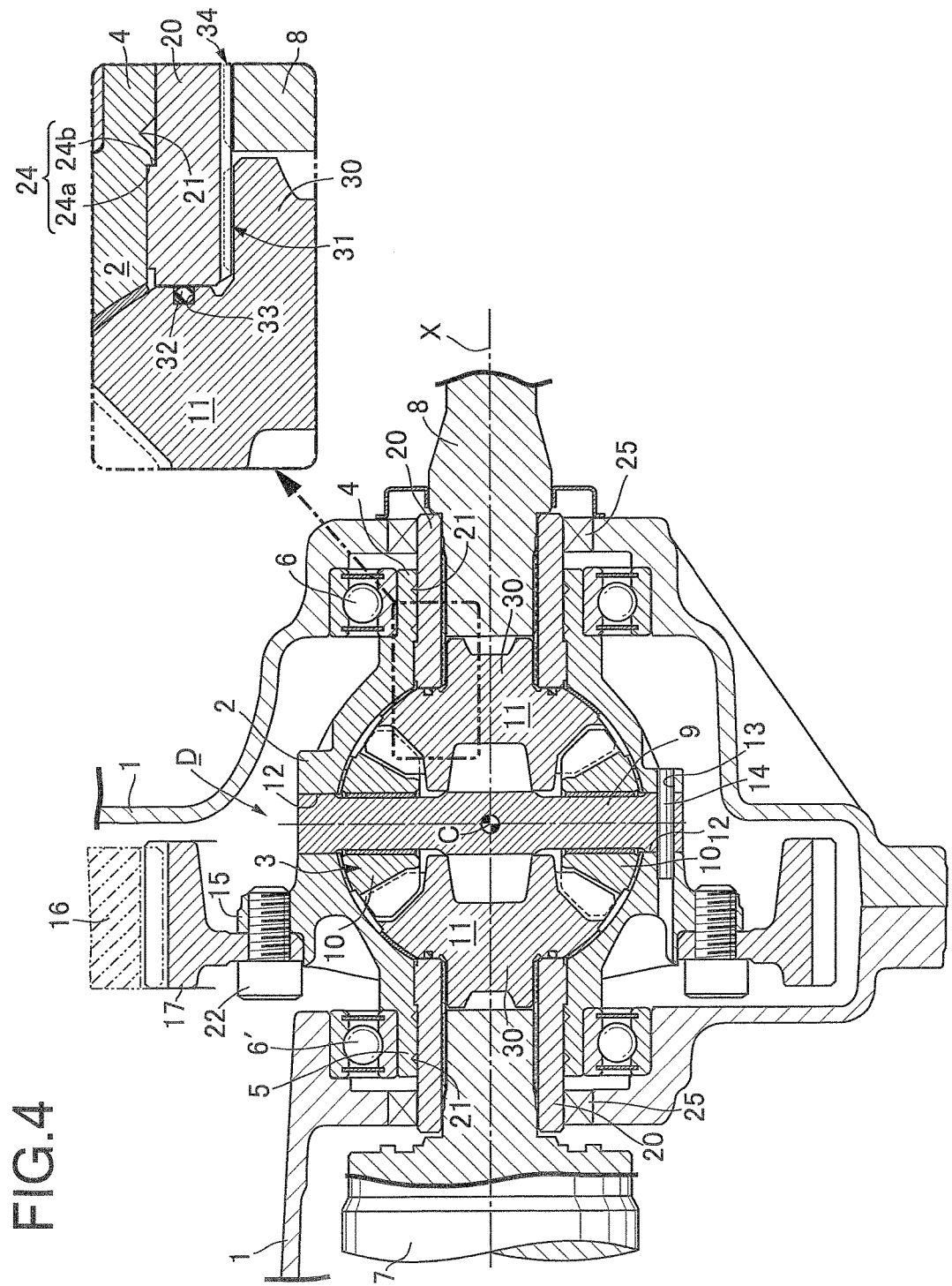
FIG. 4 is a longitudinal sectional view of a differential device according to a second embodiment of the present invention.

Next, a second embodiment of the present invention shown in FIG. 4 will be described.

In this second embodiment, short shafts 30 are integrally provided on the back faces of the side gears 11 in a protruding manner instead of the hubs 11$a$, and the short shafts 30 are fitted to the inner peripheries of the sleeves 20 via splines 31. Further, the drive shafts 7, 8 are fitted into the sleeves 20 via splines 34. Accordingly, rotating torque from the side gears 11 is transmitted to the drive shafts 7, 8 via the sleeves 20. The drive shafts do no pass through the side gear axially. Moreover, an annular seal groove 33 is provided on one of end surfaces of the side gear 11 and the sleeve 20 which face each other, and an O-ring 32 which comes in tight contact with the other end surface is attached to the seal groove 33. Except for the above-described points, the configuration of this embodiment is substantially the same as that of the previous embodiment. Accordingly, portions corresponding to those of the previous embodiment are denoted by the same reference numerals in FIG. 4, and explanations which have already been made in the previous embodiment will be omitted.

This second embodiment can also achieve effects similar to those of the previous embodiment.

The present invention is not limited to the above-described embodiments, but various design changes can be made without departing from the gist thereof. For example, in the above-described embodiments, the fastening of the ring gear 17 and the flange 15 with bolts may be replaced by joining by welding. Moreover, the annular sleeve retainers 24 may be replaced by sleeve retainers in which the sleeves 20 partially engage with the bearing bosses 4, 5 in the peripheral direction so as not to fall off. Further, the shape of the inner peripheral surface of the differential case 2 may be a box shape, a cylindrical shape, or the like instead of a spherical shape. In any of these cases, the sleeves 20 need to be configured to be capable of being passed through the inside of the differential case 2 and fitted and inserted to the inner peripheries of the bearing bosses 4, 5. Moreover, to prevent the lubricating oil in the differential case 2 from flowing out into the hubs 11$a$ of the side gears 11, plugs may be press-fitted to the inner peripheries of the hubs 11$a$ in a liquid tight manner instead of the bottom portions 11$a_1$ of the hubs 11$a$. Furthermore, the lengths of the left and right sleeves 20 may differ from each other.

What is claimed is:
1. A differential device comprising:
a differential gear mechanism; and
an integrated differential case which houses the differential gear mechanism, wherein
the differential case includes: first and second bearing bosses formed integrally on one side portion and an other side portion of the differential case and aligned on a same axis to be rotatably supported by a transmission case; and a work window for inserting the differential gear mechanism, the work window being provided in a peripheral wall of the differential case,
a pair of shaft portions are respectively formed integrally with a pair of left and right side gears of the differential gear mechanism,
the shaft portions respectively extend outward in an axial direction from back faces of the side gears,
a pair of sleeves extend outside of the differential case through the first and second bearing bosses,
the sleeves have inner peripheral surfaces thereof respectively fitted on the shaft portions,
left and right drive shafts are respectively connected to the pair of side gears or the pair of sleeves, and
out of the pair of shaft portions and the pair of sleeves, only the pair of sleeves are rotatably fitted and supported respectively on inner peripheral surfaces of the first and second bearing bosses.

* * * * *